(12) United States Patent (10) Patent No.: US 9,105,178 B2
Carlson et al. (45) Date of Patent: Aug. 11, 2015

(54) REMOTE DYNAMIC CONFIGURATION OF TELEMETRY REPORTING THROUGH REGULAR EXPRESSIONS

(71) Applicants: Jay A. Carlson, Foster City, CA (US); Vivek Chopra, Mountain View, CA (US)

(72) Inventors: Jay A. Carlson, Foster City, CA (US); Vivek Chopra, Mountain View, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 180 days.

(21) Appl. No.: 13/692,940

(22) Filed: Dec. 3, 2012

(65) Prior Publication Data

US 2014/0152461 A1 Jun. 5, 2014

(51) Int. Cl.
 *G08C 19/16* (2006.01)
 *G08C 19/00* (2006.01)
(52) U.S. Cl.
 CPC ..................... *G08C 19/00* (2013.01)
(58) Field of Classification Search
 CPC ........... A61B 19/5202; A61B 19/5212; A61B 2019/521; A61B 2019/5221; A61B 2560/0425; A61B 2562/0233; A61B 5/00; A61B 5/0075; A61B 5/0079; A61B 5/1455; A61B 5/443; A61B 5/447; A61B 5/4869
 USPC .............. 340/870.01, 870.03, 870.09, 870.4, 340/870.42, 426.18, 426.19, 426.2, 426.21, 340/445
 See application file for complete search history.

(56) References Cited

U.S. PATENT DOCUMENTS

| | | | |
|---|---|---|---|
| 3,409,877 | A | 11/1968 | Alterman et al. |
| 3,436,734 | A | 4/1969 | Pomerene et al. |
| 3,517,171 | A | 6/1970 | Avizienis |
| 3,517,174 | A | 6/1970 | Ossfeldt |
| 3,623,014 | A | 11/1971 | Doelz et al. |
| 3,668,644 | A | 6/1972 | Looschen |
| 4,485,457 | A | 11/1984 | Balaska et al. |

(Continued)

FOREIGN PATENT DOCUMENTS

| | | |
|---|---|---|
| CN | 1177808 | 4/1998 |
| CN | 1653443 | 8/2008 |

(Continued)

OTHER PUBLICATIONS

Mueller et al., "A Nested Transaction Mechanisum for LOCUS," Proceedings of the Ninth ACM Symposium on Operating System Principles (1983).

(Continued)

*Primary Examiner* — Daniel Previl
(74) *Attorney, Agent, or Firm* — Carr & Ferrell LLP

(57) ABSTRACT

A system for dynamic configuration of telemetry data may comprise a client to place a library call to a configuration server, the library call including identifying information associated with the client. The system may further comprise a processor to receive, from the configuration server, one or more regular expressions for configuration of the telemetry data collected at the client, based on the identifying information, collect, at the client, the telemetry data based on predetermined criteria, match the one or more regular expressions to the telemetry data, based on the match, selectively provide the telemetry data based on the one or more regular expressions to produce filtered telemetry data, and periodically report the filtered telemetry to the server, the filtered telemetry data including or excluding the telemetry data matching the one or more regular expressions.

24 Claims, 7 Drawing Sheets

(56) References Cited

U.S. PATENT DOCUMENTS

| | | |
|---|---|---|
| 4,587,640 A | 5/1986 | Saitoh |
| 4,752,068 A | 6/1988 | Endo |
| 4,858,930 A | 8/1989 | Sato |
| 5,014,982 A | 5/1991 | Okada et al. |
| 5,128,863 A | 7/1992 | Nakamura et al. |
| 5,222,134 A | 6/1993 | Waite et al. |
| 5,233,423 A | 8/1993 | Jernigan et al. |
| 5,273,294 A | 12/1993 | Amanai |
| 5,291,600 A | 3/1994 | Lutz et al. |
| 5,477,492 A | 12/1995 | Ohsaki et al. |
| 5,490,216 A | 2/1996 | Richardson, III |
| 5,523,551 A | 6/1996 | Scott |
| 5,532,735 A | 7/1996 | Blahut et al. |
| 5,636,277 A | 6/1997 | Nagahama |
| 5,729,214 A | 3/1998 | Moore |
| 5,794,217 A | 8/1998 | Allen |
| 5,809,145 A | 9/1998 | Slik et al. |
| 5,829,047 A | 10/1998 | Jacks et al. |
| 5,838,314 A | 11/1998 | Neel et al. |
| 5,892,900 A | 4/1999 | Ginter et al. |
| 5,913,040 A | 6/1999 | Rakavy et al. |
| 5,971,856 A | 10/1999 | Aoyama et al. |
| 6,066,182 A | 5/2000 | Wilde et al. |
| 6,070,141 A | 5/2000 | Houvener et al. |
| 6,073,123 A | 6/2000 | Staley |
| 6,081,785 A | 6/2000 | Oshima et al. |
| 6,085,262 A | 7/2000 | Sawada |
| 6,117,011 A | 9/2000 | Lvov |
| 6,119,108 A | 9/2000 | Holmes et al. |
| 6,135,646 A | 10/2000 | Kahn et al. |
| 6,137,480 A | 10/2000 | Shintani |
| 6,148,335 A | 11/2000 | Haggard et al. |
| 6,189,146 B1 | 2/2001 | Misra et al. |
| 6,195,432 B1 | 2/2001 | Takahashi et al. |
| 6,201,771 B1 | 3/2001 | Otsuka et al. |
| 6,243,796 B1 | 6/2001 | Otsuka |
| 6,247,131 B1 | 6/2001 | Kotani et al. |
| 6,260,141 B1 | 7/2001 | Park |
| 6,311,209 B1 | 10/2001 | Olson et al. |
| 6,314,451 B1 | 11/2001 | Landsman et al. |
| 6,405,203 B1 | 6/2002 | Collart |
| 6,434,535 B1 | 8/2002 | Kupka et al. |
| 6,446,260 B1 | 9/2002 | Wilde et al. |
| 6,463,078 B1 | 10/2002 | Engstrom et al. |
| 6,470,085 B1 | 10/2002 | Uranaka et al. |
| 6,499,024 B1 | 12/2002 | Stier et al. |
| 6,529,453 B1 | 3/2003 | Otsuka et al. |
| 6,560,640 B2 | 5/2003 | Smethers |
| 6,571,211 B1 | 5/2003 | Dwyer et al. |
| 6,594,740 B1 | 7/2003 | Fukuda |
| 6,611,607 B1 | 8/2003 | Davis et al. |
| 6,640,306 B1 | 10/2003 | Tone et al. |
| 6,694,025 B1 | 2/2004 | Epstein et al. |
| 6,731,940 B1 | 5/2004 | Nagendran |
| 6,811,490 B2 | 11/2004 | Rubin |
| 6,832,318 B1 | 12/2004 | Yaegashi et al. |
| 6,920,565 B2 | 7/2005 | Isaacson et al. |
| 7,043,433 B2 | 5/2006 | Hejna, Jr. |
| 7,071,914 B1 | 7/2006 | Marks |
| 7,076,445 B1 | 7/2006 | Cartwright |
| 7,216,156 B2 | 5/2007 | Chatani |
| 7,228,342 B2 | 6/2007 | Chatani |
| 7,249,139 B2 | 7/2007 | Chuah et al. |
| 7,263,462 B2 | 8/2007 | Funge et al. |
| 7,296,007 B1 | 11/2007 | Funge et al. |
| 7,313,251 B2 | 12/2007 | Rhoads |
| 7,363,384 B2 | 4/2008 | Chatani et al. |
| 7,363,443 B2 | 4/2008 | Rubin |
| 7,425,903 B2 | 9/2008 | Boss et al. |
| 7,426,750 B2 | 9/2008 | Cooper et al. |
| 7,440,431 B2 | 10/2008 | Sindhushayana et al. |
| 7,466,241 B2 | 12/2008 | Lyle et al. |
| 7,495,631 B2 | 2/2009 | Bhakta et al. |
| 7,539,737 B2 | 5/2009 | Chatani |
| 7,558,698 B2 | 7/2009 | Funge et al. |
| 7,636,645 B1 | 12/2009 | Yen et al. |
| 7,636,697 B1 | 12/2009 | Dobson et al. |
| 7,636,701 B2 | 12/2009 | Funge et al. |
| 7,703,611 B1* | 4/2010 | Appelman et al. ............ 209/206 |
| 8,112,407 B2 | 2/2012 | Jung et al. |
| 8,126,867 B2 | 2/2012 | Jung et al. |
| 8,290,604 B2 | 10/2012 | Capio |
| 8,447,421 B2 | 5/2013 | Capio |
| 8,484,219 B2 | 7/2013 | Weising |
| 2001/0016516 A1 | 8/2001 | Takatsuka et al. |
| 2001/0020295 A1 | 9/2001 | Satoh |
| 2001/0025256 A1 | 9/2001 | Oliphant et al. |
| 2001/0034721 A1 | 10/2001 | Boudreau et al. |
| 2001/0042021 A1 | 11/2001 | Matsuo et al. |
| 2001/0051996 A1 | 12/2001 | Cooper et al. |
| 2002/0016922 A1 | 2/2002 | Richards et al. |
| 2002/0041692 A1 | 4/2002 | Seto et al. |
| 2002/0052816 A1 | 5/2002 | Clenaghan et al. |
| 2002/0077988 A1 | 6/2002 | Sasaki et al. |
| 2002/0082997 A1 | 6/2002 | Kobata et al. |
| 2002/0103777 A1 | 8/2002 | Zhang |
| 2002/0103855 A1 | 8/2002 | Chatani |
| 2002/0104019 A1 | 8/2002 | Chatani et al. |
| 2002/0116206 A1 | 8/2002 | Chatani |
| 2002/0116283 A1 | 8/2002 | Chatani |
| 2002/0129094 A1 | 9/2002 | Reisman |
| 2002/0142845 A1 | 10/2002 | Randall Whitten et al. |
| 2002/0161709 A1 | 10/2002 | Floyd et al. |
| 2003/0014423 A1 | 1/2003 | Chuah et al. |
| 2003/0032486 A1 | 2/2003 | Elliott |
| 2003/0114227 A1 | 6/2003 | Rubin |
| 2004/0172323 A1 | 9/2004 | Stamm |
| 2004/0264707 A1 | 12/2004 | Yang et al. |
| 2005/0071328 A1 | 3/2005 | Lawrence |
| 2005/0090315 A1 | 4/2005 | Pehr Rubin |
| 2005/0270931 A1 | 12/2005 | Chatani |
| 2006/0002369 A1 | 1/2006 | Dowker |
| 2006/0069752 A1 | 3/2006 | Chatani |
| 2006/0264259 A1 | 11/2006 | Zalewski et al. |
| 2007/0015558 A1 | 1/2007 | Zalewski et al. |
| 2007/0015559 A1 | 1/2007 | Zalewski et al. |
| 2007/0021208 A1 | 1/2007 | Mao et al. |
| 2007/0072676 A1 | 3/2007 | Baluja |
| 2007/0082706 A1 | 4/2007 | Campbell et al. |
| 2007/0168359 A1 | 7/2007 | Jacob et al. |
| 2007/0168462 A1 | 7/2007 | Grossberg et al. |
| 2007/0239637 A1 | 10/2007 | Paek et al. |
| 2007/0243930 A1 | 10/2007 | Zalewski et al. |
| 2007/0244751 A1 | 10/2007 | Zalewski et al. |
| 2007/0255630 A1 | 11/2007 | Zalewski et al. |
| 2007/0261077 A1 | 11/2007 | Zalewski et al. |
| 2007/0287430 A1* | 12/2007 | Hosain et al. ............... 455/414.1 |
| 2008/0015878 A1 | 1/2008 | Feng et al. |
| 2008/0024722 A1 | 1/2008 | Pollard |
| 2008/0040767 A1 | 2/2008 | McCarthy et al. |
| 2008/0091512 A1 | 4/2008 | Marci et al. |
| 2008/0096668 A1 | 4/2008 | Yoshioka |
| 2008/0098448 A1 | 4/2008 | Mondesir et al. |
| 2008/0189170 A1 | 8/2008 | Ramachandra |
| 2008/0220876 A1 | 9/2008 | Mehta et al. |
| 2008/0253740 A1 | 10/2008 | Rhoads |
| 2008/0261702 A1 | 10/2008 | Rubin |
| 2009/0112810 A1 | 4/2009 | Jung et al. |
| 2009/0112914 A1 | 4/2009 | Jung et al. |
| 2009/0119188 A1 | 5/2009 | Pagan |
| 2009/0221368 A1 | 9/2009 | Yen et al. |
| 2009/0221374 A1 | 9/2009 | Yen et al. |
| 2009/0265791 A1 | 10/2009 | Ourega |
| 2009/0288064 A1 | 11/2009 | Yen et al. |
| 2009/0327099 A1 | 12/2009 | Patel et al. |
| 2010/0004896 A1 | 1/2010 | Yen et al. |
| 2010/0048300 A1 | 2/2010 | Capio |
| 2010/0049344 A1 | 2/2010 | Capio |
| 2010/0121729 A1 | 5/2010 | Betzler et al. |
| 2010/0235471 A1* | 9/2010 | Parikh et al. .................. 709/219 |
| 2010/0262924 A1 | 10/2010 | Kalu |
| 2011/0035265 A1 | 2/2011 | King et al. |
| 2011/0119151 A1 | 5/2011 | Chopra et al. |
| 2011/0208797 A1* | 8/2011 | Kim ............... 709/202 |

(56) References Cited

U.S. PATENT DOCUMENTS

| | | | | |
|---|---|---|---|---|
| 2011/0282930 | A1* | 11/2011 | Bocirnea | 709/203 |
| 2012/0072424 | A1 | 3/2012 | Weising | |
| 2014/0054379 | A1* | 2/2014 | Barvick et al. | 235/439 |

FOREIGN PATENT DOCUMENTS

| | | |
|---|---|---|
| CN | ZL028058575.2 | 9/2008 |
| CN | 101533499 | 9/2009 |
| EP | 0454340 | 10/1991 |
| EP | 0773490 A1 | 5/1997 |
| EP | 0795809 | 9/1997 |
| EP | 1016960 A1 | 7/2000 |
| EP | 1362295 | 11/2003 |
| EP | 1444022 | 8/2004 |
| EP | 2330550 | 6/2011 |
| JP | H04-253885 | 9/1992 |
| JP | H06-180674 | 6/1994 |
| JP | H09-244886 | 9/1997 |
| JP | H10-069511 | 3/1998 |
| JP | H10-133955 | 5/1998 |
| JP | H10-222428 | 8/1998 |
| JP | H11-143719 | 5/1999 |
| JP | 2000-020795 | 1/2000 |
| JP | 2000-227919 | 8/2000 |
| JP | 2000-298689 | 10/2000 |
| JP | 2001-169246 | 6/2001 |
| JP | 2001-340656 | 12/2001 |
| JP | 2004-524612 | 8/2004 |
| JP | 2004-526240 | 8/2004 |
| JP | 2005-505358 | 2/2005 |
| JP | 2007-293901 | 11/2007 |
| JP | 2008-104502 | 5/2008 |
| JP | 2009-500127 | 1/2009 |
| JP | 2009-213736 | 9/2009 |
| JP | 2010-255985 | 11/2010 |
| JP | 2011-001082 | 1/2011 |
| JP | 2013-002964 | 1/2013 |
| JP | 5395037 | 10/2013 |
| KR | 1998-030143 | 7/1998 |
| KR | 1998-033266 | 7/1998 |
| KR | 2000-0060715 | 10/2000 |
| KR | 10-2005-0034586 | 4/2003 |
| KR | 2003-0087004 | 11/2003 |
| KR | 10-2005-6243500 | 3/2006 |
| KR | 10-2009-0001479 | 1/2009 |
| WO | 0016229 | 3/2000 |
| WO | 0063860 | 10/2000 |
| WO | 0201333 | 1/2002 |
| WO | 02067093 | 8/2002 |
| WO | 03031004 | 4/2003 |
| WO | 2007008713 | 1/2007 |
| WO | 2012039849 | 3/2012 |

OTHER PUBLICATIONS

International Search Report for PCT/US02/05141 mailed Aug. 19, 2002.
Supp. European Search Report for EP1362295 mailed Dec. 6, 2006.
Communication from the Examining Division for EP 02713641.5 mailed Aug. 27, 2009.
109/110 Communication from the Examining Division regarding possible amendment of claims for EP 02713641.5 mailed Aug. 27, 2009.
International Search Report for PCT/US02/32439 mailed Apr. 17, 2003.
International Preliminary Examination Report for PCT/US02/32439 mailed Apr. 10, 2004.
Supp. European Search Report for EP02769044 mailed Dec. 9, 2004.
109/110 Communication from the Examining Division regarding possible amendment of claims for EP 02769044 mailed May 25, 2004.
Communication from the Examining Division for EP 02769044 mailed May 13, 2005.
Communication from the Examining Division for EP 02769044 mailed Apr. 10, 2006.
Invitation to declare maintenance of the application and to correct deficiencies in the Written Opinion / Amend Application for EP 02769044 mailed Dec. 23, 2004.
Decision to Refuse the Application from the Examining Division for EP 02769044 mailed Feb. 9, 2009.
International Search Report for PCT/US11/47132 mailed Dec. 15, 2011.
Extended European Search Report for EP10007804 mailed Jan. 21, 2011.
Communication from the Examining Division for EP 10007804.7 mailed Jul. 30, 2012.
Summons to attend oral proceedings for EP 10007804.7 mailed Mar. 15, 2013.
Decision to Refuse the Application from the Examining Division for EP 10007804.7 mailed May 23, 2013.
Statement in accordance with the Notice from the European Patent Office dated Oct. 1, 2007 concerning business methods (OJ Nov. 2007; p. 572f).
IMB DOS 3.3 Ref. Card (1987).
Oni Game Manual [online], released Jan. 2001 [retreived on Feb. 25, 2009]. <URL: http://replacementdocs.com>.
First Rejection in CN application 02808575.2 mailed Jul. 28, 2006.
Second Rejection in CN application 02808575.2 mailed Aug. 3, 2007.
Notice of Allowance in CN application 02808575.2 mailed May 16, 2008.
Rejection in KR 10-2004-7005102 mailed Oct. 25, 2005.
Rejection in JP 2010-255985 mailed Nov. 20, 2012.
Questioning in JP 2010-255985 mailed May 28, 2013.
Notice of Allowance in JP 2010-255985 mailed Oct. 15, 2013.
Toben, Graham and Runkel, John. "Online 'Warcraft' 'Wow' Game Grips Millions in U.S., Abroad". San Jose Mercury News (SJ)—Tuesday, Nov. 15, 2005. Morning Edition.
Chan, Bruno. "Average Gameplay". New Straits Times. Kuala Lumpur: Apr. 7, 2008. p. 20.
Hutchens, Bill. "Warcraft creates amazing online world". The News Tribune. Tacoma, Wash.: Jan. 14, 2005. p. G.19.

* cited by examiner

REMOTE DYNAMIC CONFIGURATION OF TELEMETRY REPORTING THROUGH REGULAR EXPRESSIONS

FIELD

This disclosure relates generally to collecting digital information and, more particularly, to methods and systems for remote configuration for capture of telemetry data based on name spaces and regular expressions.

BACKGROUND

Currently, most applications or devices at release time have no way of knowing what pieces of information collected as telemetry information will be useful until after the usage trends are analyzed. Because of this, the application or the device has to transmit all of the data to the server first. The server then has to sift through the data before analyzing.

SUMMARY

This summary is provided to introduce a selection of concepts in a simplified form that are further described in the Detailed Description. This summary is not intended to identify key features or essential features of the claimed subject matter, nor is it intended to be used as an aid in determining the scope of the claimed subject matter.

The present disclosure is related to remotely dynamically configuring capture of telemetry data based on name spaces and regular expressions. In some embodiments, the technology may involve capturing in telemetry information for near real-time analytics and aggregated information reports.

A computer-based method for dynamic configuration of telemetry data may include placing a library call to a configuration server, the library call may include identifying information associated with a client, receiving from the configuration server one or more regular expressions for configuration of the telemetry data collected at the client based on the identifying information, collecting the telemetry data at the client based on predetermined criteria, matching the one or more regular expressions to the telemetry data, selectively providing the telemetry data based on the one or more regular expressions to produce filtered telemetry data, and periodically reporting the filtered telemetry to the server. The filtered telemetry data may exclude or include only the telemetry data matching the one or more regular expressions.

A client device or application, through the telemetry library, may request information from a server at startup time. The client device may periodically receive a set of regular expressions as configuration for the client's behavior. A server may send a list of regular expressions to be applied to the locally generated names of telemetry data to be captured on the client. In some embodiments, only those names that match the regular expressions may be captured for transmission to the server. In other embodiments, only those names that do not match the regular expressions may be captured and later sent to the server. This approach may allow the server to configure the client to limit or expand the amount of data captured and reported to the server by client devices or applications transparently with no changes required by the client to change its behavior.

This technology may allow the client application or device to be dynamically configured by a server to collect just the data that the developers, producers, manufacturers, or managers are interested in. At the same time, it may also reduce network traffic and data-warehouse storage costs by not transmitting unwanted information. Features, examples, and embodiments are described below.

BRIEF DESCRIPTION OF THE DRAWINGS

Embodiments are illustrated by way of example, and not by limitation in the figures of the accompanying drawings, in which like references indicate similar elements and in which.

DETAILED DESCRIPTION

Figure 1:
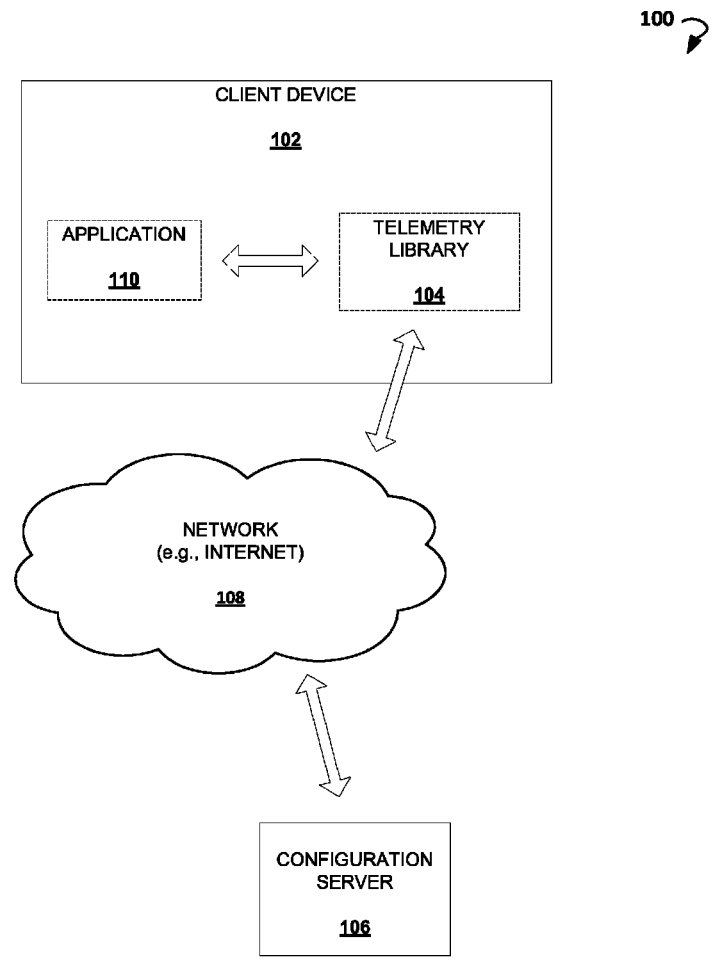
FIG. 1 shows a block diagram illustrating a system environment suitable for receiving configuration information and capturing telemetry information.

The following detailed description includes references to the accompanying drawings, which form a part of the detailed description. The drawings show illustrations in accordance with exemplary embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

The techniques of the embodiments disclosed herein may be implemented using a variety of technologies. For example, the methods described herein may be implemented in software executing on a computer system or in hardware utilizing either a combination of microprocessors or other specially designed application-specific integrated circuits (ASICs), programmable logic devices, or various combinations thereof. In particular, the methods described herein may be implemented by a series of computer-executable instructions residing on a storage medium such as a disk drive, or computer-readable medium. It should be noted that methods disclosed herein can be implemented by a computer (e.g., a desktop computer, tablet computer, laptop computer), game console, handheld gaming device, cellular phone, smart phone, smart television system, and so forth.

The embodiments described herein relate to computer-implemented methods for remotely dynamically configuring capture of telemetry data based on name spaces and regular expressions. The methods may be implemented within a network such as the Internet.

According to the example embodiments discussed below, the telemetry data may be collected by the client side telemetry library within the client device. The client device may be one or more of a game console, a mobile device, a computer, a tablet computer, a smartphone, and so forth. The client device or application may send and receive data from the telemetry library to determine which telemetry data to capture.

The telemetry library may be broken down into several stages or processes: startup, logging, and reporting.

In the startup process, the telemetry library may be first initializes by the client application or device. The telemetry library may contact the configuration server with identifying information specific to the client application or device to retrieve the configuration information. The configuration server may search using the identifying information and may return the configuration regular expressions related to the identifying information to the telemetry library.

In the logging data process, client application or device may use the telemetry library application programming interface (API) call to capture data, using a name to identify the data along with the scope or name space it belongs to. The telemetry library may generate a signature using the scope hierarchy, the name supplied, and the type of information being captured. The telemetry library may use the configuration regular expressions sent by the server and may discard the data that matches the configuration regular expressions. If there is no match to the generated signature, the telemetry library may add the data to its collection of data being captured. Alternatively, in some other embodiments, telemetry library may discard the data that does not match the configuration regular expressions.

In the reporting captured data process, periodically, at a convenient time for the client application or device, the telemetry library may be called to transmit the captured data collection to the server for processing.

In one embodiment, the telemetry library may use a "Name:Value" pairing combination to uniquely identify telemetric data. The "Name" that is associated with the telemetric data may be generated based on concatenating the scope names (name space information) along with the individual name of the information being collected and also the type of information being collected. This concatenation of names may generate a text string that can be tested using regular expressions for matching and therefore filtered away on a match.

In one embodiment, a scope session may be created each time a scope is opened for purposes of data collection.

In one embodiment, some types of telemetric data collected by the telemetry library and the associated tag used for entry signature generation may include: string data (_S), numeric value (_V), event (_E), counter (_C), and timer (_T).

Using a list of regular expressions sent from the server, the client application or device may filter away the telemetry entries that are no longer needed. For example, data may be filtered based on a simple regular expression mechanism of having an asterisk (*) match 0 or more of all characters except a forward-slash (/) and having the plus (+) character match 0 or more of any character.

In some embodiments, adding additional complexity to the regular expression parser may give finer grained control over the filtering if it is desired.

The embodiments described herein can be implemented by various means, depending on the application. For example, the embodiments can be implemented in hardware, firmware, software, or in a combination thereof. For hardware implementation, the embodiments can be implemented with processors, controllers, micro-controllers, microprocessors, electronic devices, other electronic units designed to perform the functions described herein, or a combination thereof. Memory can be implemented within a processor or external to the processor. As used herein, the term "memory" refers to any type of long term, short term, volatile, nonvolatile, or other storage device and is not to be limited to any particular type of memory or number of memories, or type of media upon which memory is stored. For firmware and/or software implementation, the embodiments can be implemented with modules such as procedures, functions, and so on, that perform the functions described herein. Any machine-readable medium tangibly embodying instructions can be used in implementing the embodiments described herein.

Referring now to the drawings, FIG. 1 shows an example system environment 100 for dynamically configuring the client to capture telemetry data. The system environment 100 comprises a client device 102, an application 110, a telemetry library 104, a configuration server 106, and a network 108. The network 108 may couple the configuration server 106 and the telemetry library 104 within the client device 102. The client application 110 communicates with the telemetry library 104 within the client device 102.

According to various embodiments, the client device 102 may refer to a computer (e.g., a desktop computer, laptop computer and tablet computer), game console, portable game console, cellular phone, smart phone, television system, online television system, and so forth. Regardless of the type of the client device 102, it includes an input unit, display unit, and a network interface unit to provide networked connectivity.

The network 108 can be a wireless or wired network, or a combination thereof. For example, the network may include one or more of the following: the Internet, local intranet, PAN, LAN, WAN, MAN (Metropolitan Area Network), virtual private network (VPN), storage area network (SAN), frame relay connection, Advanced Intelligent Network (AIN) connection, synchronous optical network (SONET) connection, digital T1, T3, E1 or E3 line, Digital Data Service (DDS) connection, DSL (Digital Subscriber Line) connection, Ethernet connection, ISDN (Integrated Services Digital Network) line, dial-up port such as a V.90, V.34 or V.34bis analog modem connection, cable modem, ATM (Asynchronous Transfer Mode) connection, or an FDDI (Fiber Distributed Data Interface) or CDDI (Copper Distributed Data Interface) connection. Furthermore, communications may also include links to any of a variety of wireless networks including, WAP (Wireless Application Protocol), LTE (Long Term Evolution), GPRS (General Packet Radio Service), GSM (Global System for Mobile Communication), CDMA (Code Division Multiple Access) or TDMA (Time Division Multiple Access), cellular phone networks, Global Positioning System (GPS), CDPD (cellular digital packet data), RIM (Research in Motion, Limited) duplex paging network, Bluetooth radio, or an IEEE 802.11-based radio frequency network. The network can further include or interface with any one or more of the following: RS-232 serial connection, IEEE-1394 (Firewire) connection, Thunderbolt, Fiber Channel connection, IrDA (infrared) port, SCSI (Small Computer Systems Interface)

connection, USB (Universal Serial Bus) connection, or other wired or wireless, digital or analog interface or connection, mesh or Digi® networking.

Figure 2:
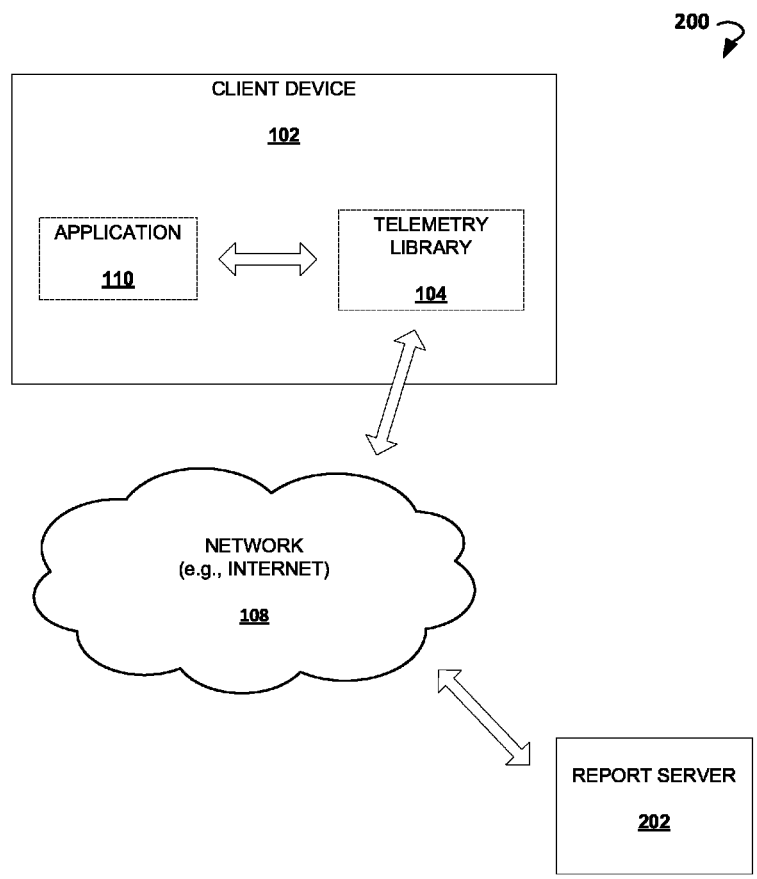
FIG. 2 shows a block diagram illustrating a system environment suitable for sending reports of captured telemetry information.

FIG. 2 shows an example system environment 200 for sending reports of captured telemetry data. The system environment 200 may comprise a client device 102, an application 110, a telemetry library 104, a report server 202, and a network 108. The network 108 may couple the report server 202 and the telemetry library 104. The client application 110 may communicate with the telemetry library 104 within the client device 102.

Figure 3:
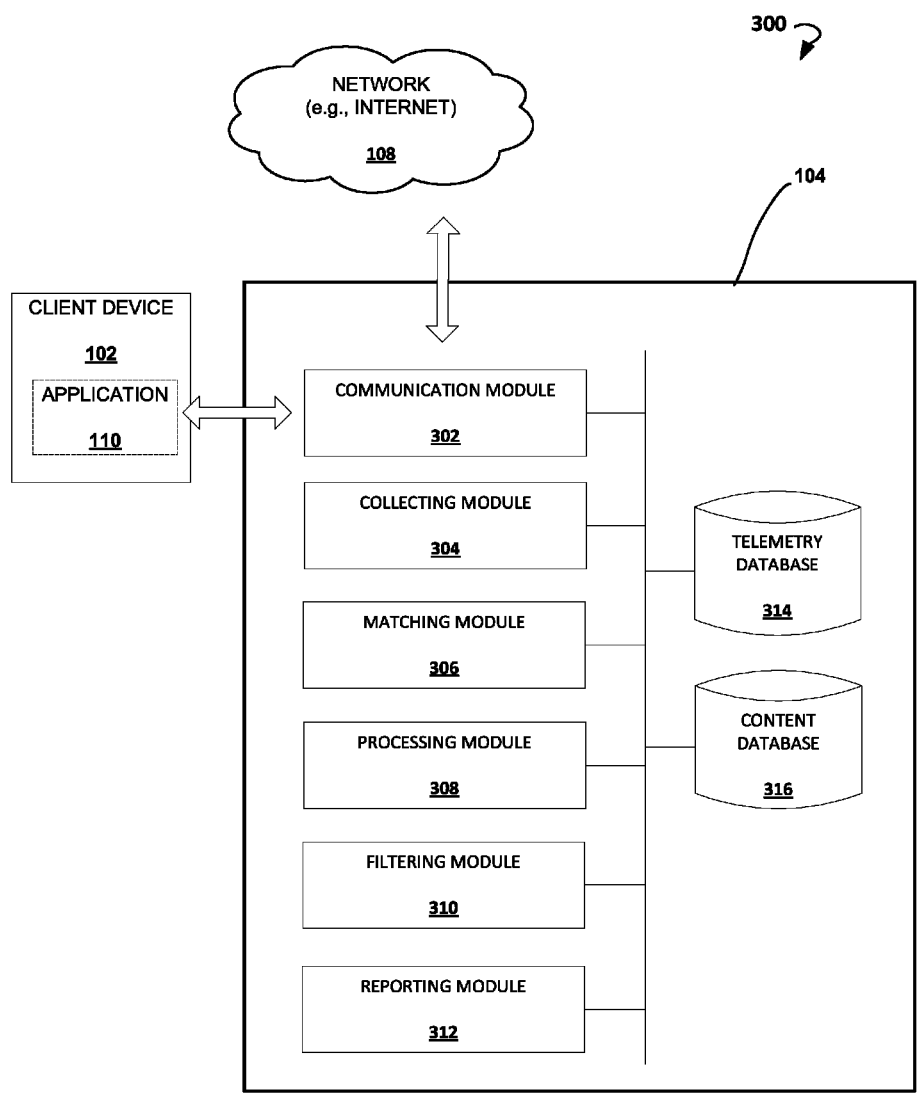
FIG. 3 is a block diagram illustrating an exemplary system for a telemetry library structure.

The telemetry library 104 may include multiple modules, as illustrated in the example system environment of FIG. 3. Specifically, the telemetry library 104 may include a communication module 302, a collecting module 304, a matching module 306, a processing module 308, a filtering module 310, a reporting module 312, a telemetry database 314, and a content database 316. Both the client application 110, within the client device 102, and the network 108 may connect with the telemetry library 104 through the communication module 302.

In some embodiments, the content database 316 may store information such as the identifying information and data received from the configuration server 106.

In some embodiments, the telemetry library 104 may have Hypertext Transfer Protocol (HTTP) Client code. Communications between the telemetry library 104 and the network 108 may be through the HTTP.

In some embodiments, data exchanges between the telemetry library 104 and the network may be done using communication systems such as JSON, BSON, Thrift, Protocol Buffers, or similar protocols. By using an agreed upon communications protocol, any client or server implementation can be created to generate or consume telemetry data.

In one embodiment, communications may be validated using cryptographic signatures.

Figure 4:
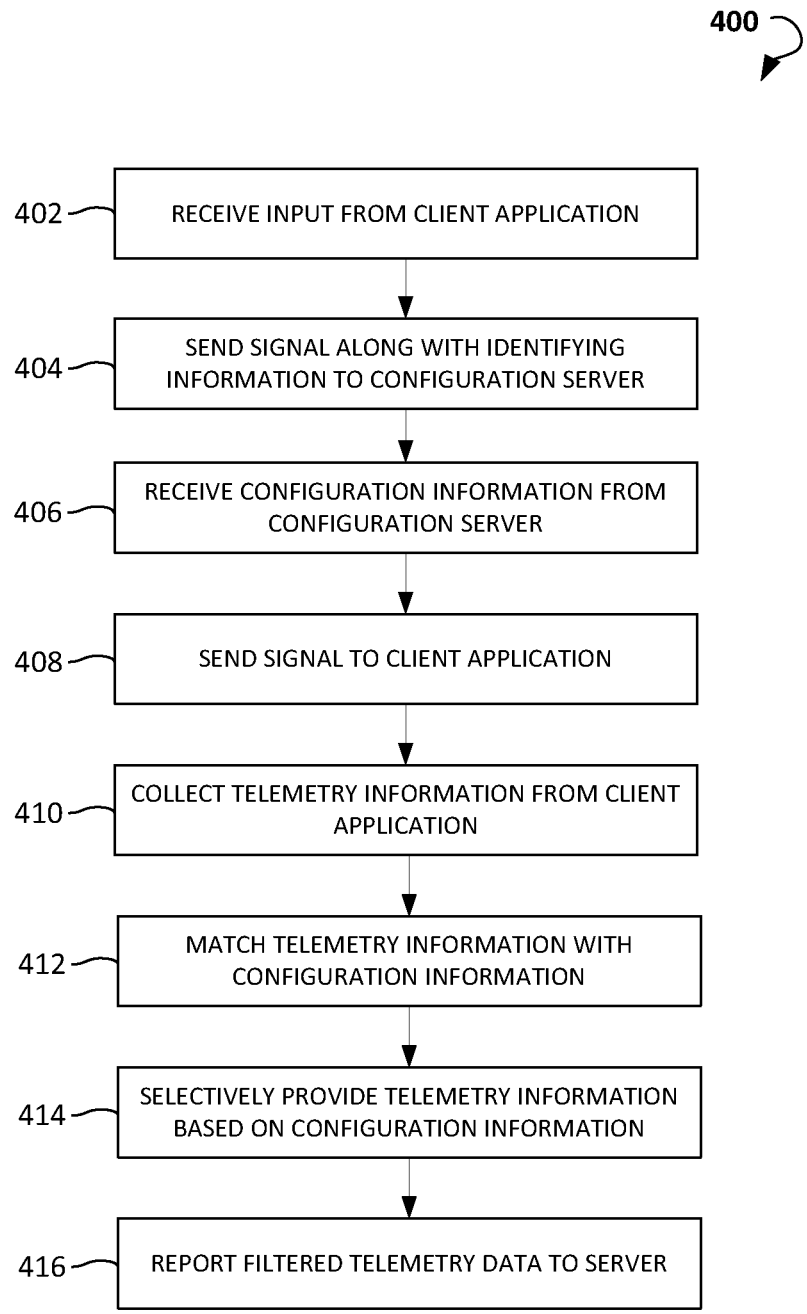
FIG. 4 is a process flow chart illustrating exemplary telemetry library processing the configuration information.

FIG. 4 illustrates a process flow chart 400 of a telemetry library processing the configuration information. The method 400 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the telemetry library 104.

The method 400 may be performed by the various modules discussed above with reference to FIG. 3. Each of these modules may comprise processing logic. It will be appreciated by one of ordinary skill that examples of the foregoing modules may be virtual, and instructions said to be executed by a module may, in fact, be retrieved and executed by a processor. The foregoing modules may also include memory cards, servers, and/or computer disks. Although various modules may be configured to perform some or all of the various steps described herein, fewer or more modules may be provided and still fall within the scope of example embodiments.

As shown in FIG. 4, the method 400 may commence at operation 402 with the telemetry library 104 receiving an input from the client application 110 that the device has turned on or the application has started. Receiving may be performed in any suitable manner. The content at this step may also be stored in the content database 316.

At operation 404, the telemetry library 104 may send a signal ("flag") along with identifying information to the configuration server 106. Such signal may be a library call. In one example, such identifying information may be associated with the client device 102 or application 110. In another example, the identifying information may be associated with the user of the client device.

At operation 406, the telemetry library 104 may receive configuration information from the configuration server. The configuration information may be indicative of whether the service is enabled, whether reporting is enabled, and one or more regular expressions for filtering telemetry entries.

At operation 408, the telemetry library 104 may send a signal to the client application 110. Such signal may consist of information indicating whether communication with the configuration server 106 was successful. In an example, if the connection with the configuration server 106 was unsuccessful, an error message regarding connectivity may be displayed on the client device 102.

At operation 410, the telemetry library 104 may collect telemetry information from the client application. The collected telemetry information may be stored in the telemetry database 314. Even if the service and/or the reporting are disabled, the telemetry library 104 may collect the telemetry information from the client application. The information collecting may also happen even if the telemetry library 104 could not connect to the configuration server 106.

At operation 412, the telemetry library 104 may match the one or more regular expressions with the collected telemetry information. At operation 414, the telemetry information may be selectively provided based on the one or more regular expressions to produce filtered telemetry data. The filtered telemetry data may only include the telemetry data matching the one or more regular expressions. In some other embodiments, the filtered data may exclude the telemetry data matching the one or more regular expressions.

At operation 416, the telemetry library 104 may send a report to the report server 202. Depending on whether the data matching the regular expressions is included or excluded, the report may contain the telemetry information that matches or does not match the one or more regular expressions.

Figure 5:
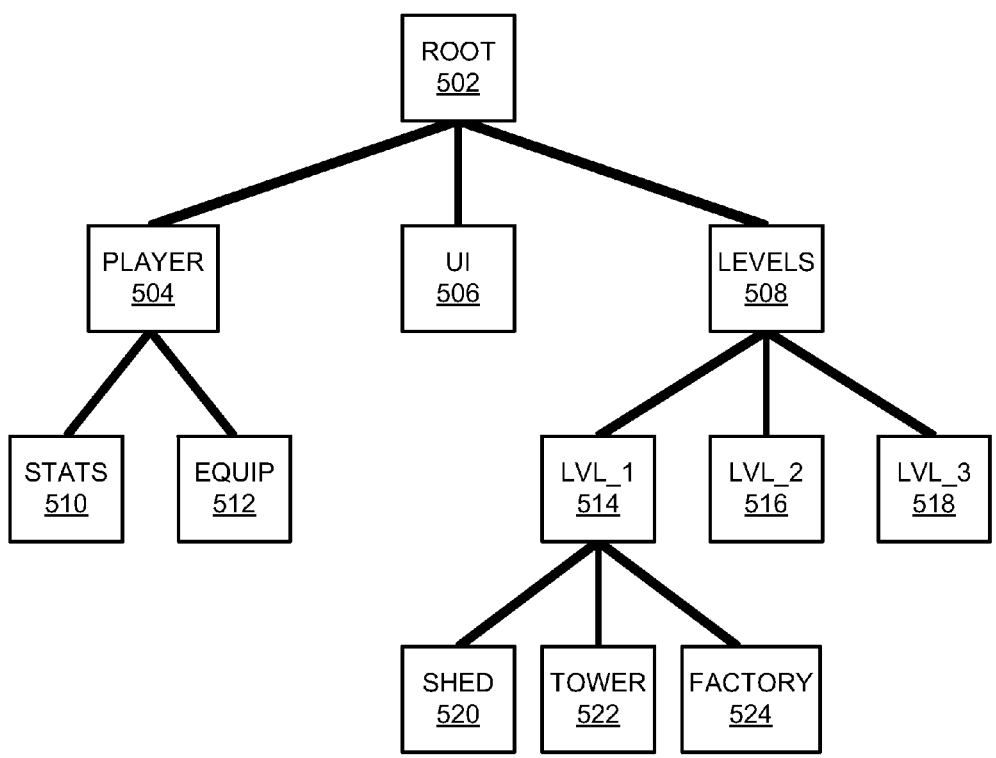
FIG. 5 shows a block diagram illustrating exemplary telemetry data organized in hierarchical groupings of entries.

In one example, the telemetry data may be organized in hierarchical groupings 500, as illustrated in FIG. 5. The collecting module 304 within the telemetry library 104 may organize the captured telemetry information into logical groupings called scopes. Such scopes may be named and arranged in a hierarchical tree underneath the corresponding application. The entities may be identified by their scope "path", their given name, and their type. In this example, a first-person shooter game may have three levels of application scope allowed from the root scope 502. The root scope 502 may be automatically created at application startup. The first level may contain three scopes: player scope 504, user interface (UI) scope 506, and levels scope 508. Each of these scopes may contain information that is relevant to the corresponding scope. For example, the player scope 504 may contain data on the player's stats and equipment. These two types of data could be grouped into separate scopes. The stats scope 510 may contain data on the player's stats such as health and armor. The equipment scope 512 may contain data on the player's gear such as primary and secondary weapons, ammunition, and miscellaneous items.

The hierarchical tree may have numerous levels depending on the detail in grouping the data. For example, the levels scope 508 may have multiple level scopes underneath it such as $lvl_{13}$ 1 scope 514, $lvl_{13}$ 2 scope 516, and $lvl_{13}$ 3 scope 518. Within each level scope, there may be a scope for each area or building. In this example, the lvl__1 scope 514 has scopes for shed 520, tower 522, and factory 524.

Figure 6:
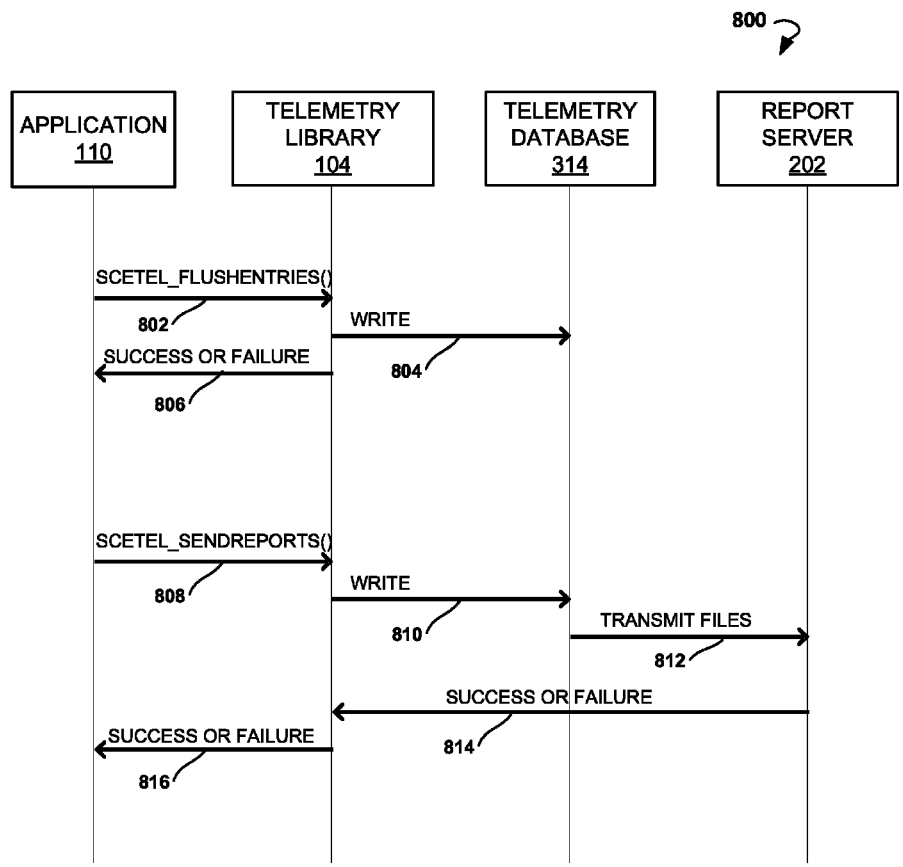
FIG. 6 shows a diagram illustrating a system environment suitable for sending reports.

FIG. 6 shows another example system environment 800 for sending reports of captured telemetry information to the report server 202, similar to the one described in FIG. 2. The system environment 600 comprises an application 110, a telemetry library 104, a telemetry database 314, and a report server 202. The telemetry database 314, as shown in FIG. 3, may be located within the telemetry library 104. As in the example illustrated in FIG. 2, the telemetry library 104, through the communication module 302, may communicate with the report server 202 using a network 108.

In this example, the client application 110 may flush the aggregate entries at the start of the application 110. This may commence at operation 802 with the application 110 sending a command to the telemetry library 104 to flush all the entries aggregated. The telemetry library 104 may then send a command to telemetry database 314 to clear the entries stored in the telemetry database 314 and start aggregating new data entries, at operation 804. Information indicating success or failure of the flush may be sent by the telemetry library 104 to the application 110, as shown in operation 806.

In the same example, the client application may send a report of the captured telemetry data. This process may commence at operation 808 with the application 110 sending a command to the telemetry library 104 to send a report to the report server 202. At operation 810, the telemetry library 104 may send a command to the telemetry database 314 to transmit the filtered telemetry data to the report server 202. At the following operation 812, the filtered telemetry data may be transmitted to the report server 202 through a network 108. Information on the transmission success may be sent back to the telemetry library at operation 814. At operation 816, this same information may be sent to the application 110 from the telemetry library 104.

Figure 7:
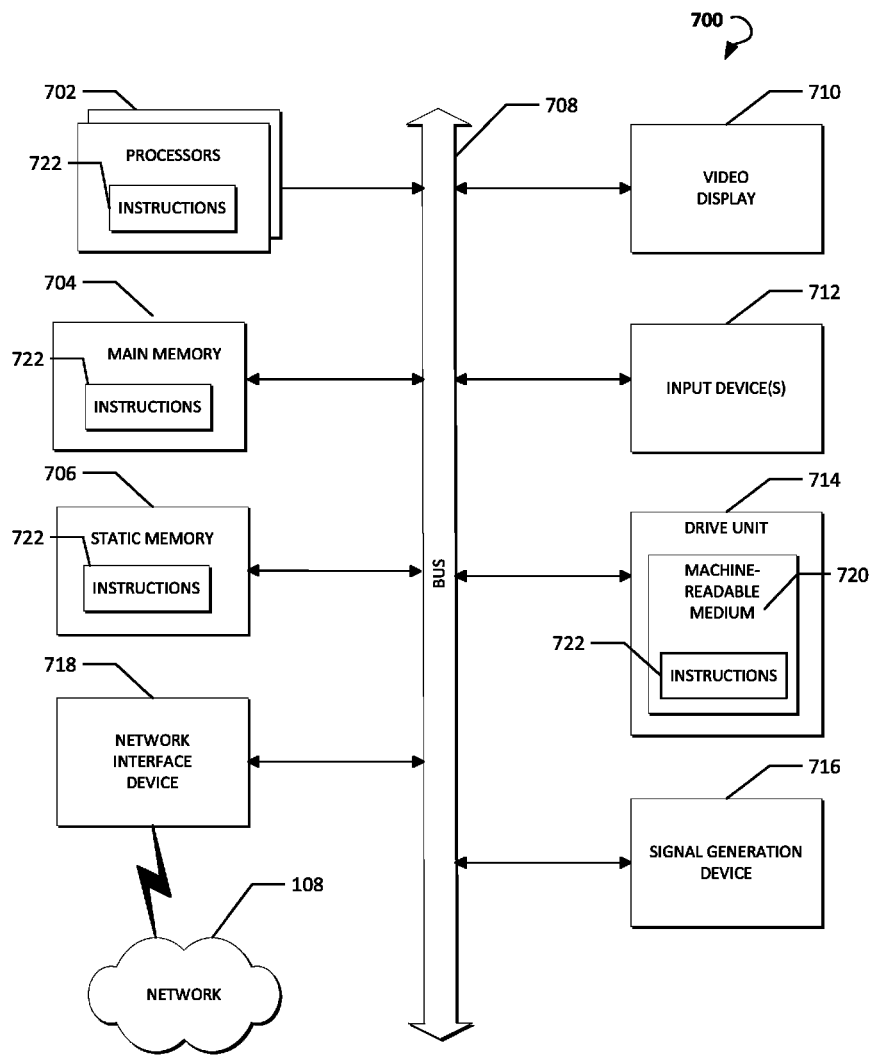
FIG. 7 is a diagrammatic representation of an exemplary machine in the form of a computer system within which a set of instructions for the machine to perform any one or more of the methodologies discussed herein is executed.

FIG. 7 shows a diagrammatic representation of a computing device for a machine in the example electronic form of a computer system 700, within which a set of instructions for causing the machine to perform any one or more of the methodologies discussed herein can be executed. In example embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a personal computer (PC), a tablet PC, a set-top box (STB), a PDA, a cellular telephone, a portable music player (e.g., a portable hard drive audio device, such as an Moving Picture Experts Group Audio Layer 3 (MP3) player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processor or multiple processors 702 (e.g., a central processing unit (CPU), a graphics processing unit (GPU), or both), and a main memory 704 and a static memory 706, which communicate with each other via a bus 708. The computer system 700 can further include a video display unit 710 (e.g., a liquid crystal display (LCD) or cathode ray tube (CRT)). The computer system 700 also includes at least one input device 712, such as an alphanumeric input device (e.g., a keyboard), a cursor control device (e.g., a mouse), a microphone, a digital camera, a video camera, and so forth. The computer system 700 also includes a disk drive unit 714, a signal generation device 716 (e.g., a speaker), and a network interface device 718.

The disk drive unit 714 includes a computer-readable medium 720 which stores one or more sets of instructions and data structures (e.g., instructions 722) embodying or utilized by any one or more of the methodologies or functions described herein. The instructions 722 can also reside, completely or at least partially, within the main memory 704 and/or within the processors 702 during execution thereof by the computer system 700. The main memory 704 and the processors 702 also constitute machine-readable media.

The instructions 722 can further be transmitted or received over the network 108 via the network interface device 718 utilizing any one of a number of well-known transfer protocols (e.g., Hyper Text Transfer Protocol (HTTP), CAN, Serial, and Modbus).

While the computer-readable medium 720 is shown in an example embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, flash memory cards, digital video disks, random access memory (RAM), read only memory (ROM), and the like.

The example embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems. Although not limited thereto, computer software programs for implementing the present method can be written in any number of suitable programming languages such as, for example, Hypertext Markup Language (HTML), Dynamic HTML, Extensible Markup Language (XML), Extensible Stylesheet Language (XSL), Document Style Semantics and Specification Language (DSSSL), Cascading Style Sheets (CSS), Synchronized Multimedia Integration Language (SMIL), Wireless Markup Language (WML), Java™, Jini™, C, C++, Perl, UNIX Shell, Visual Basic or Visual Basic Script, Virtual Reality Markup Language (VRML), ColdFusion™ or other compilers, assemblers, interpreters or other computer languages or platforms.

Thus, methods and systems for remotely dynamically configuring capture of telemetry data based on name spaces and regular expressions have been described. The disclosed technique provides a useful tool for individuals such as developers, producers, manufacturers, and managers to dynamically configure client applications or devices to collect data that they are interested in. The configuration can be performed remotely and at run-time to only capture data developers and others are interested in receiving. The captured telemetry data is filtered and sent to a server, where developers and others may analyze the information.

Although embodiments have been described with reference to specific example embodiments, it will be evident that various modifications and changes can be made to these example embodiments without departing from the broader spirit and scope of the present application. Accordingly, the specification and drawings are to be regarded in an illustrative rather than a restrictive sense.

What is claimed is:

1. A computer-based method for dynamic configuration of telemetry data, the method comprising:
    placing, via executable instructions stored in a memory and executed by a processor, a library call to a configuration server, the library call including identifying information associated with at least one of a client and a user of the client;
    receiving from the configuration server, via the executable instructions, based on the identifying information, one or more regular expressions for configuration of the telemetry data collected at the client;
    collecting at the client, via the executable instructions, the telemetry data based on predetermined criteria;
    matching, via the executable instructions, the one or more regular expressions to the telemetry data;
    selectively providing, via the executable instructions, the telemetry data based on the one or more regular expressions to produce filtered telemetry data; and
    periodically reporting, via the executable instructions, the filtered telemetry data to the server.

2. The method of claim 1, wherein the client is a client application.

3. The method of claim 1, wherein the filtered telemetry data includes the telemetry data matching the one or more regular expressions.

4. The method of claim 1, wherein the filtered telemetry data excludes the telemetry data matching the one or more regular expressions.

5. The method of claim 1, wherein the client is a client device.

6. The method of claim 1, wherein the identifying information is associated with a client device.

7. The method of claim 1, wherein the identifying information is associated with a user of a client device.

8. The method of claim 7, wherein the client device is one or more of a game console, a mobile device, a computer, a tablet computer, and a smartphone.

9. The method of claim 1, wherein the one or more regular expressions are provided in response to a startup of the client.

10. The method of claim 1, where the one or more regular expressions are received in response to a user login at the client.

11. The method of claim 1, where the one or more regular expressions are received with a request for reporting.

12. The method of claim 1, wherein the telemetry data includes a string generated based on one or more of a name, a name space, type of the telemetry data, and a value.

13. A system for dynamic configuration of telemetry data, the system comprising:
    a client to place a library call to a configuration server, the library call including identifying information associated with at least one of the client and a user of the client; and
    a processor to:
    receive, from the configuration server, one or more regular expressions for configuration of the telemetry data collected at the client, based on the identifying information;
    collect, at the client, the telemetry data based on predetermined criteria;
    match the one or more regular expressions to the telemetry data;
    selectively provide the telemetry data based on the one or more regular expressions to produce filtered telemetry data; and
    periodically report the filtered telemetry data to the server.

14. The system of claim 13, wherein the client is a client application.

15. The system of claim 13, wherein the filtered telemetry data includes the telemetry data matching the one or more regular expressions.

16. The system of claim 13, wherein the filtered telemetry data excludes the telemetry data matching the one or more regular expressions.

17. The system of claim 13, wherein the client is a client device.

18. The system of claim 13, wherein the identifying information is associated with a client device.

19. The system of claim 13, wherein the identifying information is associated with a user of a client device.

20. The system of claim 19, wherein the client device is one or more of a game console, a mobile device, a computer, a tablet computer, and a smartphone.

21. The system of claim 13, wherein the one or more regular expressions are provided in response to a startup of the client.

22. The system of claim 13, where the one or more regular expressions are received in response to a user login at the client.

23. The system of claim 13, where the one or more regular expressions are received with a request for reporting.

24. A non-transitory processor-readable medium having embodied thereon instructions being executable by at least one processor to perform a method for dynamic configuration of telemetry data, the method comprising:
    placing a library call to a configuration server, the library call including identifying information associated with at least one of a client and a user of the client;
    based on the identifying information, receiving, from the configuration server, one or more regular expressions for configuration of the telemetry data collected at the client;
    collecting, at the client, the telemetry data based on predetermined criteria;
    matching the one or more regular expressions to the telemetry data;
    selectively providing the telemetry data based on the one or more regular expressions to produce filtered telemetry data; and
    periodically reporting the filtered telemetry data to the server.

* * * * *